United States Patent [19]
Schenk

[11] Patent Number: 5,580,685
[45] Date of Patent: Dec. 3, 1996

[54] MULTI-LAYERED BATTERY GRIDS AND METHODS OF FORMING BATTERY GRIDS

[75] Inventor: Raymond L. Schenk, Marysville, Mich.

[73] Assignee: Venture Enterprises, Incorporated, Grosse Pointe, Mich.

[21] Appl. No.: 314,355

[22] Filed: Sep. 28, 1994

[51] Int. Cl.⁶ .................................................. H01M 4/74
[52] U.S. Cl. ........................................ 429/234; 429/244
[58] Field of Search ................................ 429/234, 241, 429/243, 244; 204/286

[56] References Cited

U.S. PATENT DOCUMENTS

| | | |
|---|---|---|
| Re. 16,856 | 1/1928 | Gelstharp . |
| 677,244 | 6/1901 | Madden ........................ 429/234 |
| 989,075 | 4/1911 | Staples . |
| 1,291,603 | 1/1919 | Nagy . |
| 1,636,242 | 7/1927 | Prachar . |
| 2,171,132 | 8/1939 | Simons . |
| 2,664,605 | 1/1954 | Beste . |
| 3,069,486 | 12/1962 | Solomon et al. ........... 429/244 X |
| 3,284,859 | 11/1966 | Conlon et al. . |
| 3,300,821 | 1/1967 | Nichols et al. . |
| 3,431,971 | 3/1969 | Gyongyos . |
| 3,844,336 | 10/1974 | Anderson ..................... 164/277 |
| 4,016,633 | 4/1977 | Smith et al. . |
| 4,199,849 | 4/1980 | Moreau ............................ 29/2 |
| 4,276,924 | 7/1981 | Ljung ........................... 164/130 |
| 4,343,347 | 10/1982 | Liebermann et al. ......... 164/463 |
| 4,487,792 | 12/1984 | Hartmann ................. 429/234 X |
| 4,534,404 | 8/1985 | McLane et al. .............. 164/429 |
| 4,544,014 | 10/1985 | McLane et al. .............. 164/429 |
| 4,545,422 | 10/1985 | McLane et al. .............. 164/429 |
| 4,749,635 | 6/1988 | Muller et al. .............. 429/241 X |

FOREIGN PATENT DOCUMENTS 62-117269  5/1987  Japan .................. H01M 4/73

*Primary Examiner*—Stephen Kalafut
*Attorney, Agent, or Firm*—Harness, Dickey & Pierce, P.L.C.

[57] ABSTRACT

The present invention is directed to a method of manufacturing battery grids. In particular, a method of simultaneously casting multiple battery grid strips on a continuous casting machine is provided. The mold includes a bipartite grid cavity having a pair of adjacent grid cavity segments which communicate with each other through a common groove such that the resultant dual grid strip formed thereon includes a corresponding pair of grid strip segments that are interconnected by a series of flexible or frangible nodes. A dual grid strip can be folded along the flexible or frangible nodes to form a layered grid strip. The layered grid strip is then pasted with an active material and cut into individual battery plates.

16 Claims, 4 Drawing Sheets

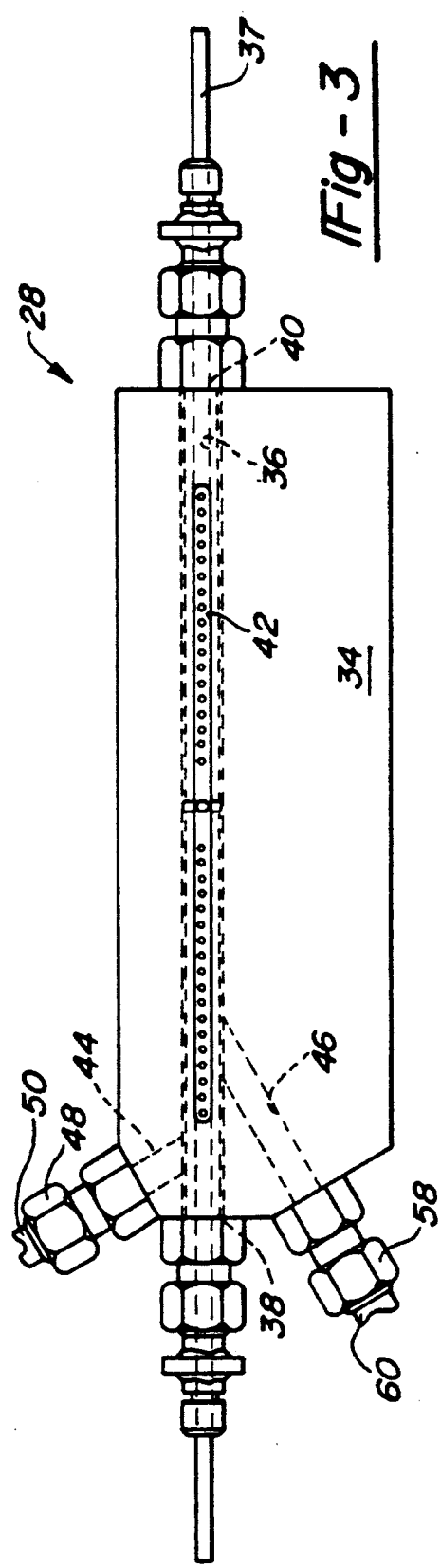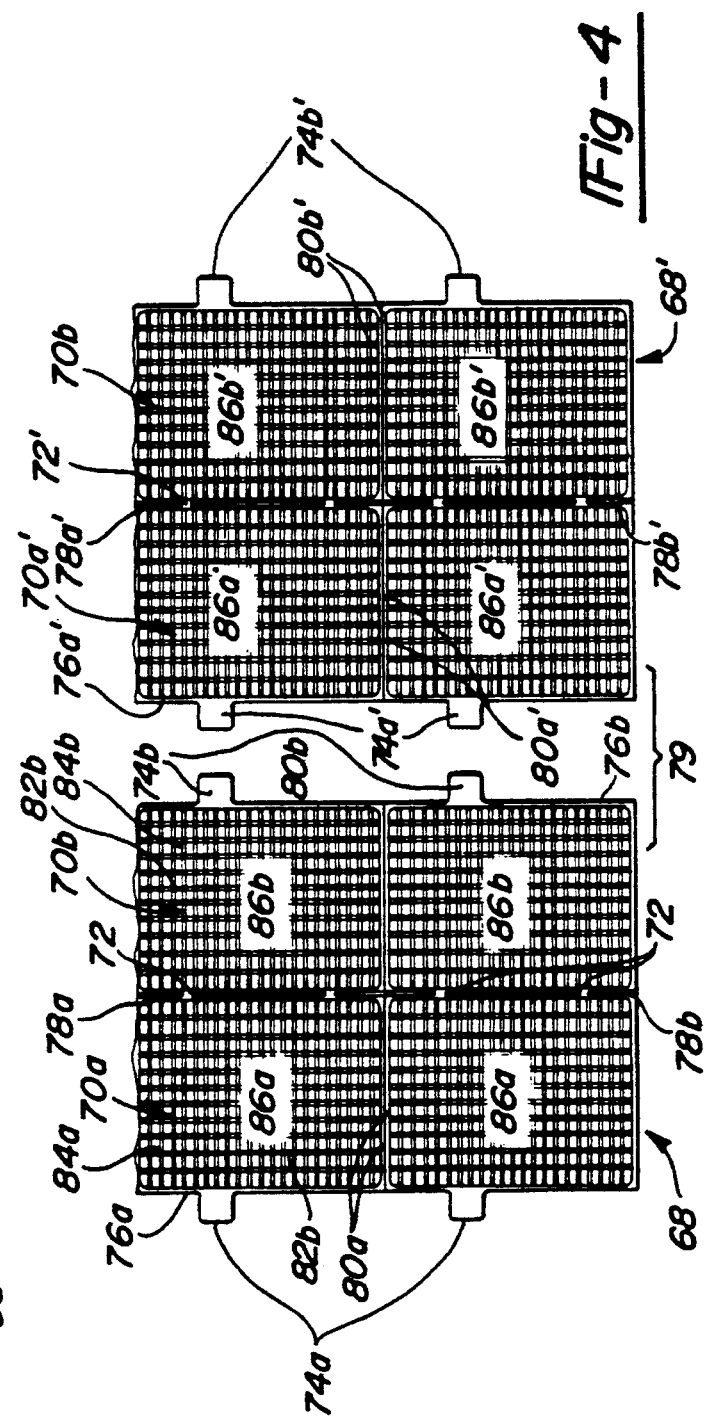

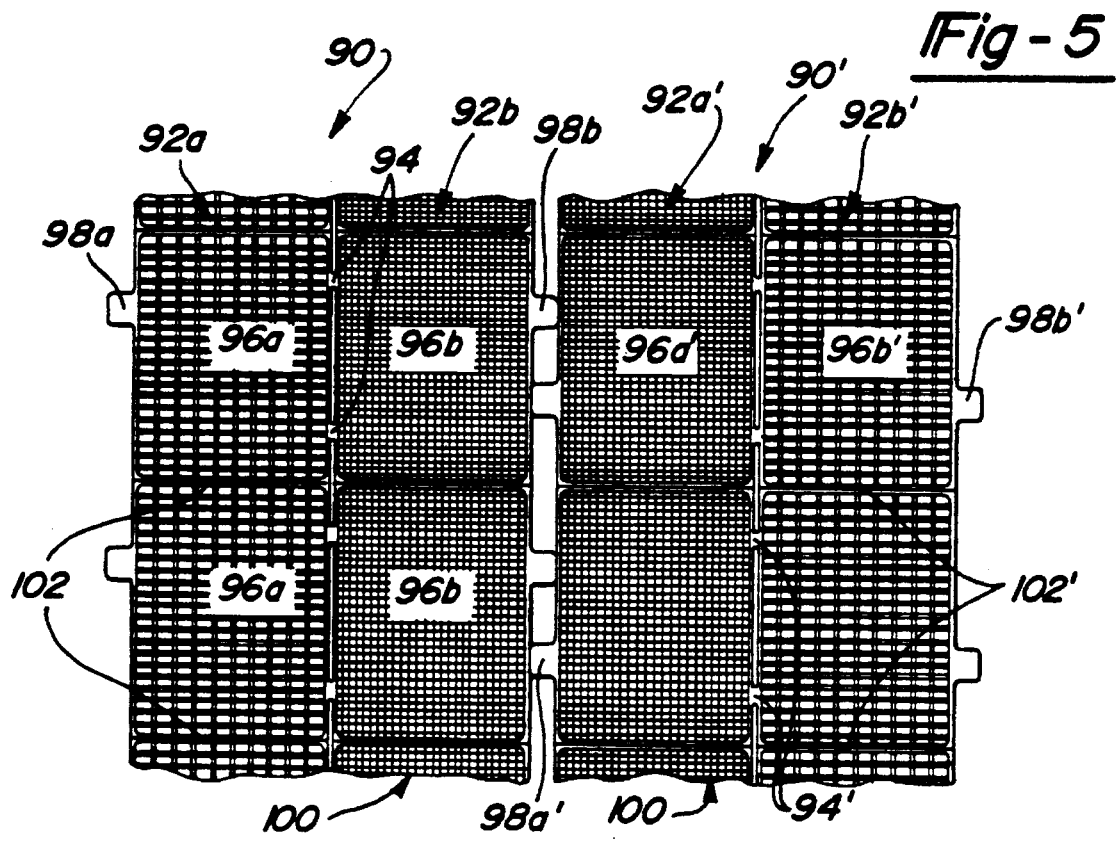
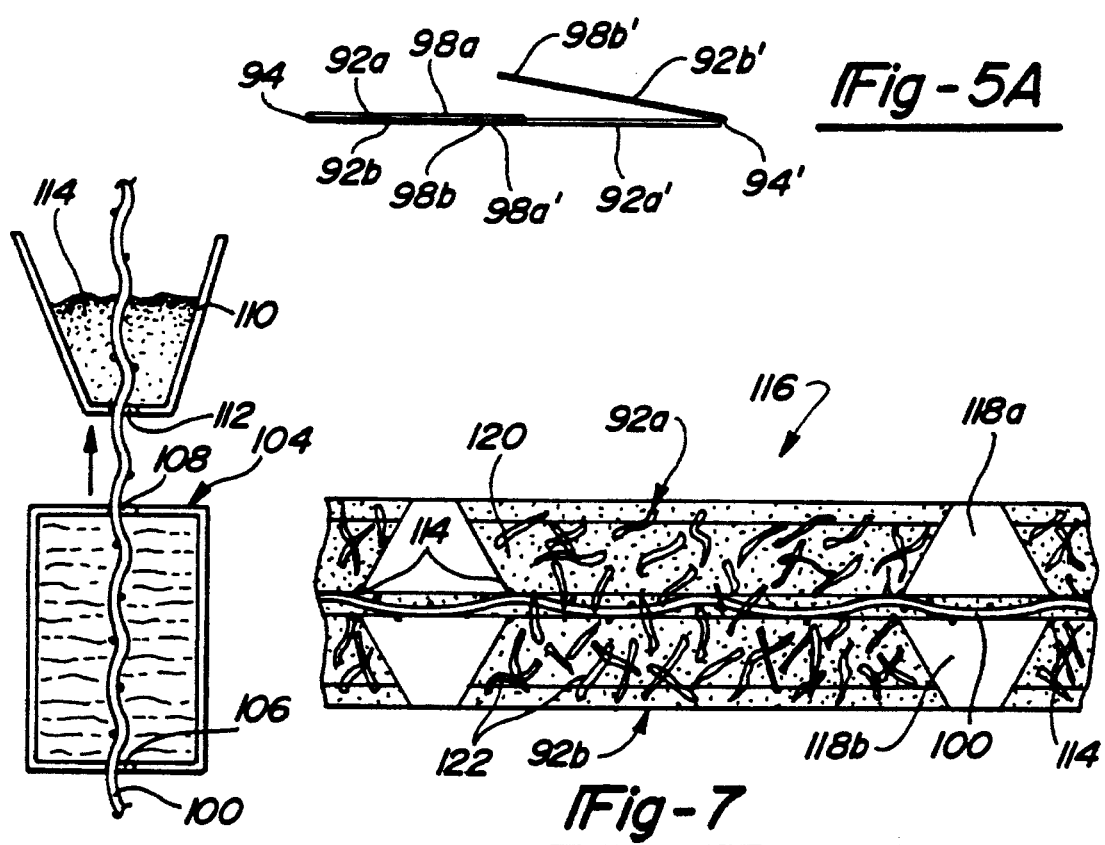

MULTI-LAYERED BATTERY GRIDS AND METHODS OF FORMING BATTERY GRIDS

FIELD OF THE INVENTION

The present invention relates generally to battery grids of the type used in lead-acid batteries and, more particularly, to multi-layered battery grids and a method for simultaneously casting multiple battery grid strips on a continuous casting machine to form single and multi-layered battery grids.

BACKGROUND OF THE INVENTION

Lead-acid batteries are a well known source of energy used in a variety of applications including, for example, automotive starting and industrial uses. The central structural elements of conventional lead-acid batteries are positive and negative grids coated with an active material to form plates, each plate having a lug and being separated from adjacent plates within a battery by porous separators. Typically, the battery grids are made from lead or a lead alloy and have a reticulated portion (reticulum) on which the active paste material is supported. The reticulum is bounded by a rigid border from which the lug(s) extend. As is known, the lugs are used for collecting grid current and joining plates of like polarity together in a cell. Thus, the grids serve as the framework and electrical contact between the positive and negative active materials which generally serve to conduct current. This conjoint electrochemical (corrosion) action and structural (load-bearing) role causes stress to the grids, particularly the positive grids. In most instances, failure of the battery occurs when the grids are no longer able to provide adequate structural support or current flow. Therefore, the primary properties of interest in the design and manufacture of battery grids are strength and resistance to both corrosive and mechanical stresses. Other properties to consider include the compatibility of the grid material with the active material (adherence) and various electrochemical and metallurgic effects.

Modernly, a large percentage of the battery grids used in commercially-available lead-acid batteries are manufactured by a process generically referred to as "continuous casting" (con-cast). Traditionally, continuous casting machines include a rotary drum having a reticulated grid pattern (i.e. mold cavity) machined into its outer peripheral surface, and a stationery shoe which overlays the grid pattern. The shoe functions both to dispense the molten lead into the patterned mold cavity and to scrape off any excess molten lead upon rotation of the drum. Due to rapid solidification of the molten lead, a continuous grid strip is removed from the drum upon rotation past the shoe. One example of a conventional continuous casting machine and the lead con-cast process associated therewith is disclosed in U.S. Pat. No. 4,349,067 issued to Wirtz et al.

Unfortunately, the continuous casting process suffers from several drawbacks which significantly limit its battery grid production capabilities. First, due to the rapid solidification characteristics of molten lead, large temperature gradients occur in the molten lead as it is discharged from the shoe and delivered across the entire width of the patterned mold cavity. Such temperature gradients result in significant variations in the grain structure of the lead upon its solidification. As is known, poor grain structure contributes to increased corrosion, decreased strength, disruption of the reticulum and eventual battery failure. To avoid such undesirable temperature gradients, it is typically required that the width of the shoe be relatively narrow which, in turn, prohibits or severely limits the capability of concurrently forming multiple grid strips. As such, the productivity (i.e. grids/min.) of continuous casting machines can not be increased above known processing limitations without compromising grid quality. Second, it is well known that conventional con-cast processing can not consistently form positive battery grids with the desired mechanical strength and resistance to mechanical and corrosive stresses. In particular, it is an industry belief that conventional con-cast processing is impractical for manufacturing positive battery grids because normal processing variations result in grids having an improper grain structure which, in turn, leads to increased corrosion and mechanical stress on the grids. Another consideration is the turbulence caused by the rotational speed of the casting mold. Increased turbulence contributes to mechanical defects in grid formation. Since positive grids differ from negative grids in that positive grids require greater strength due to anodic attack, they are generally formed with an increased cross-sectional thickness in comparison to negative grids. However, the increased mold depth required for casting positive grids is not conducive to con-cast processing because gradient cooling and flow turbulence caused during delivery of the molten lead typically results in poor grain formation. Moreover, the increased cross-sectional area required for positive grids requires the utilization of gratuitous lead. As such, lead battery grids are relatively expensive and contribute substantially to battery weight.

To alleviate these disadvantages, designs have been developed such as the one shown in U.S. Pat. No. 4,221,854, to Hammar et al., which discloses a lightweight laminated grid for use in lead-acid storage batteries. These laminated grids are formed by an expanded metal process which generally requires the perforation and expansion of a lead strip to form the open mesh reticulum. Unfortunately, grids formed by expanded metal processing generally are not high quality. Specifically, the quality is known to need improvement for use as positive grids. Thus, recognized deficiencies exist in the manufacture of battery grids which, at this point, have not been adequately addressed.

SUMMARY OF THE INVENTION

Accordingly, the present invention is directed to overcoming past deficiencies and shortcomings in battery grid production by providing a method of simultaneously casting multiple battery grid strips on a continuous casting machine which allows the speed of rotation of the casting mold to be decreased while generating a concomitant increase in productivity. As such, deficiencies in grid quality herebefore related to turbulence and temperature gradients are overcome so that cast products have an improved grain structure, increased strength and resistance to corrosive and mechanical stresses, and yet can be formed at a high productivity rate.

In accordance with each preferred embodiment of the present invention, a method of manufacturing battery grids is disclosed which includes the step of delivering a molten casting material at a uniform temperature through a shoe and into a continuous patterned grid cavity formed on, or mounted to, a rotating casting mold. More preferably, a pair of grid cavities are aligned side-by-side to form a pair of continuous grid strips that can be formed individually or joined together. The patterned grid cavities can be arranged to form continuous grid strips having lugs that face each other, face away from each other, or in a combination thereof.

In one particular embodiment of the present invention, the method includes providing a bipartite or "dual" grid cavity having a pair of adjacent grid cavity segments which communicate with each other through a common groove such that the resultant "dual" grid strip formed thereon includes a corresponding pair of grid strip segments that are interconnected by a series of flexible or frangible nodes. The interconnected grid cavity segments are arranged such that the continuous grid strip formed therefrom has lug strips provided along its outer longitudinal edges. Moreover, a pair of dual grid cavities can be provided in side-by-side alignment on the casting mold to form a pair of grid strips that are either formed individually or joined together.

The method of the present invention can further be expanded to include the step of folding the dual grid strip along the flexible or frangible nodes to form a "layered" grid strip. As such, the lugs and the wires forming the reticulum of the individual grid strip segments are either aligned or staggered in the resulting layered grid strip. Thereafter, the layered grid strip is pasted with the active material and cut into individual battery plates.

In another embodiment, the method of the present invention can further be expanded to include the step of laying down a scrim on one of the grid strip segments of the continuous dual grid strip prior to folding thereof. As such, the resulting product is a laminated layered grid strip. In a related embodiment, the method of the present invention further includes the steps of heating the scrim, coating the scrim with an adhesive binder material, folding the grid strip, and compressing the layered grid strip to form a bonded laminate.

Also provided by the present invention are the grid strips and grid plates formed by each of the methods described herein. In particular, layered grid plates comprising two electrically conductive reticulum are made from the layered grid strip. Also, laminated grid plates comprising two electrically conductive reticulum having a scrim located therebetween are provided. Additionally, laminated grid plates comprising two electrically conductive reticulum and a scrim bonded therebetween are also provided. The lugs and wires of the layered grids can be either staggered or aligned. Moreover, all of the layered grid strips formed in accordance with the present invention have the strength to be processed without the need for side borders.

As will be appreciated, the present invention can include various combinations of the above-described embodiments. It is also appreciated that other materials besides lead can be used in the methods of the present invention, and that other products besides battery grids can be formed.

Additional objects, advantages, and features of the present invention will become apparent from the following description and appended claims, taken in conjunction with the accompanying drawings.

BRIEF DESCRIPTION OF THE DRAWINGS

FIG. 3 is a side view of the shoe used on the continuous casting machine shown in FIGS. 1 and 2;

FIG. 4 is a partial plan view of a pair of interconnected battery grid strips formed according to one preferred method of the present invention;

FIG. 5 is a partial plan view of a pair of interconnected battery grid strips that are formed according to another preferred method of the present invention;

FIG. 5A is a side view of one of the interconnected battery grid strips as it is folded in a subsequent step to the method utilized in FIG. 5 to form a layered grid strip;

FIG. 6 is a sectional side view of a battery grid strip being formed according to yet another preferred method of the present invention; and FIG. 7 is a partial sectional side view of the battery grid strip shown being formed in FIG. 6 as used in a battery plate;

DETAILED DESCRIPTION OF THE PREFERRED EMBODIMENTS

In general, the present invention is directed to various methods of simultaneously casting two or more continuous battery grid strips on a continuous casting machine and the battery grid plates formed thereby. The methods are improved versions of otherwise conventional continuous casting processes but as taught herein, the methods provide an increased productivity rate in combination with improved grid quality and a reduction in the amount of casting material used. More particularly, multiple battery grid strips of common or differing dimensions are continuously formed on a rotating mold component and are either formed individually or formed interconnected and subsequently separated. Additionally, layered grid strips are formed by folding over a pair of interconnected grid strips or by layering one of the grid strips with a scrim and then folding over the interconnected grid strips. While the methods and products thereof according to the present invention are shown in association with a particular continuous casting machine, it will be appreciated that the machine shown is merely exemplary of but one type to which the novel features of the present invention are applicable.

Figure 1:
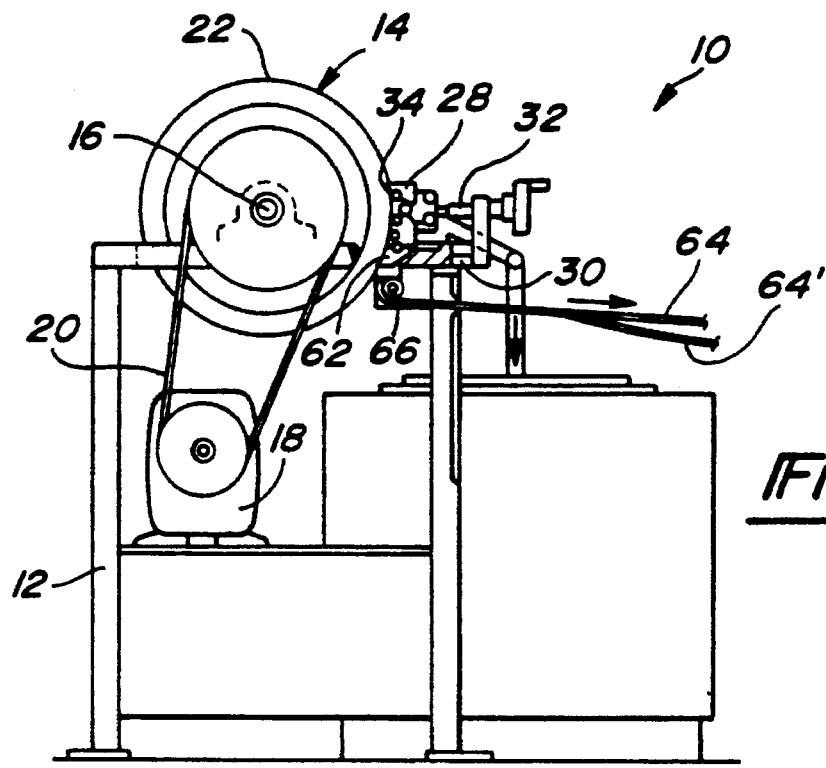
FIG. 1 is a side elevational view of a continuous casting machine equipped with a rotating casting mold having patterned grid cavities formed therein, the machine being utilized in accordance with the various methods of the present invention.
Figure 2:
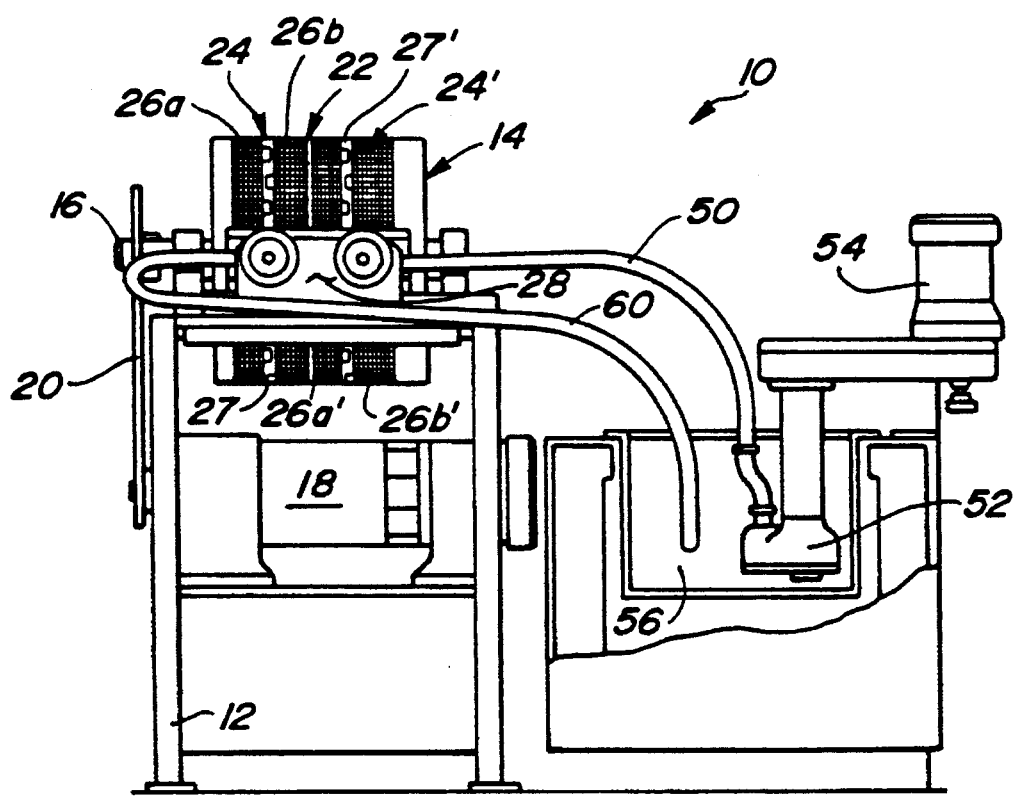
FIG. 2 is an end view of the machine shown in FIG. 1.

Referring to FIGS. 1 and 2, a continuous casting machine 10 is shown to include a frame 12 on which a casting drum 14 is journalled on shaft 16 for rotation about a horizontal axis. Casting drum 14 is rotated at a desired speed by a motor 18 and drive chain 20 arrangement. In the particular embodiment shown, a mold 22 including a pair of bipartite or "dual" grid cavities 24 and 24' that are laterally aligned in a side-by-side orientation is provided on the outer peripheral surface of casting drum 14. The pattern (i.e., reticulum, borders, lug arrangement, etc.) for two grid cavities 24 and 24' can be identical or, in the alternative, can define different grid patterns. As shown in FIG. 2, dual grid cavity 24 includes a pair of laterally aligned grid cavity segments 26A and 26B while dual grid cavity 24' includes a pair of laterally aligned grid cavity segments 26A' and 26B'. In the embodiment shown, the corresponding sets of grid cavity segments are aligned such that their respective lug segments 27 and 27' are adjacent thereto. In a similar manner, the pattern for grid cavity segments 26A and 26B can be identical or different with respect to one another, as is also true for grid cavity segments 26A' and 26B'.

With continued reference to FIGS. 1 and 2, a shoe 28 is shown mounted to a slide base 30 and is urged against the periphery of casting drum 14 with a desired pressure by means of adjustable clamp 32. As is conventional, shoe 28 has an outer surface 34 which conforms closely to, and which is in sliding engagement with, a short arcuate segment of casting drum 14. Moreover, outer surface 34 of shoe 28 is sized to extend across casting drum 14 to completely cover grid cavities 24 and 24'. As will be appreciated, outer surface 34 can be of any profile which facilitates smooth sliding movement of a cavity mold relative thereto. As such, outer surface 34 can be smooth or have grooves formed therein such as is disclosed in U.S. Pat. No. 4,545,422 issued Oct. 8, 1985, to McLane et al., the disclosure of which is incorporated by reference. As known, the use of grooves on the outer shoe surface forms a battery grid reticulum having back ribs.

In accordance with the methods of the present invention, shoe 28 acts to disperse a molten casting material, such as lead, into grid cavities 24 and 24' on mold 22 as well as scrape away excess material. The following description of shoe 28 is based on a preferred construction which is more thoroughly disclosed in copending and commonly owned U.S. application Ser. No. 08/249,874 entitled "Shoe For Use On Continuous Casting Machine And Method Of Use" filed Jul. 20, 1994, the entire disclosure of which is incorporated by reference herein. In general, shoe 28 is equipped with one or more supplemental heaters positioned in direct communication with the molten material flowing therethrough for maintaining the molten casting material at a desired homogeneous casting temperature. Such an arrangement is advantageous since the resulting continuous grid strips formed upon solidification of the molten lead have a more homogeneous grain structure which, in turn, promotes increased service life and reduced corrosive and mechanical fatigue.

Referring to FIG. 3, shoe 28 includes an elongated internal passageway 36 having a first open end 38 and a second open end 40 and within which an elongated heating mechanism 37 is disposed. Actuation of heating mechanism 37 is controlled by an electrical controller device (not shown) for maintaining the molten material flowing within passageway 36 at the desired casting temperature immediately prior to its discharge through a slot 42 extending between passageway 36 and outer shoe surface 34. Shoe 28 also includes an inlet passage 44 and an outlet passage 46 both of which communicate with passageway 36. With reference back also to FIGS. 1 and 2, inlet passage 44 is coupled, via a suitable coupling 48, to a supply line 50 which, in turn, is coupled to an outlet port of a pump 52 that is driven by a variable speed motor 54. Pump 52 is maintained below the liquid level of the molten casting material within a heated pot 56. Similarly, outlet passage 46 of shoe 28 is coupled, via a suitable coupling 58, to a return line 60 for returning excess lead to heated pot 56. Variable speed motor 54 is controlled by the electrical controller for causing pump 52 to supply molten casting material to internal passageway 36 at a predetermined flow rate. Thus, molten material from heated pot 56 is directed through supply line 50 and inlet passage 44 of shoe 28, wherein it is uniformly heated by heating mechanism 37. Thereafter, the molten casting material is discharged through slot 42 to fill the patterned grid cavities 24 and 24'. A water spray pipe 62 is positioned directly below shoe 28 to assist in the rapid solidification of the casting material into a pair of continuous bipartite or "dual" grid strips 64 and 64' that are discharged on the downstream side of shoe 28, stripped from mold 22, and directed around an elongated roller 66.

In accordance with the preferred methods of the present invention, mold 22 has a cross-sectional depth which provides for battery grids having the requisite strength to endure anodic attack. As an example, a conventional starting, lighting and ignition battery used for automobiles has positive battery grids which have an average cross-sectional depth of about 0.065 inches. However, the desired cross-sectional depth for a positive battery grid will vary from battery to battery, as is well known. Due to the use of a plurality of continuous grid cavity segments (i.e., 26A, 26B, 26A' and 26B'), the speed at which mold 22 is rotated can be reduced so as to be conducive to forming positive battery grids. For example, if the grids formed each have a length of 5½ inches, then mold 22 can be rotated at a suitable speed to form 55 grids/min., on each grid cavity segment. Thus, 220 battery grids can be formed per minute on con-cast machine 10. Utilization of shoe 28 having a supplemental heating mechanism disposed therein, in combination with mold 22 having multiple grid cavity segments and being rotated at a reduced speed, results in a decrease in flow turbulence and temperature gradients in the molten lead and an increase in the productivity rate of high quality grids. Battery grid strips 64 and 64' are preferably stripped from casting drum 14 so that they will have cooled to a sufficiently low temperature to assume a sufficiently rigid condition to facilitate further processing such as pasting. After pasting, dual grid strips 64 and 64' are advanced to shear dies which separate the individual grid strip segments at their respective lug strip intersection to form four individual grid strips. Concurrently therewith or subsequently thereto, the individual grid strips can be cut into individual battery plates for subsequent assembly into a battery in a known manner.

Now referring to FIG. 4, a partial plan view of a pair of laterally-aligned dual grid strips 68 and 68' is shown that are formed on con-cast machine 10 according to an alternative preferred method of the present invention. Without reiterating the obvious, dual grid strips 68 and 68' are formed from corresponding dual grid cavities associated with casting drum 14 and can have identical patterns or differing patterns. The components or elements of grid strip 68' that are identical or substantially similar to those of grid strip 68 are identified by a primed reference numeral, with the following disclosure focused only on grid strip 68 for purposes of brevity. Battery grid strip 68 is formed to include a pair of grid strip segments 70A and 70B that are interconnected along a common edge by a series of flexible or frangible nodes 72. In the embodiment shown, grid strip segments 70A and 70B are symmetrical about the common edge on which nodes 74 are formed. It will be appreciated that symmetrical segments are also contemplated by the present invention.

Lugs 74A and 74B border the outer longitudinal edges of grid strip segments 70A and 70B of grid strip 68. Moreover, grid strip segments 70A and 70B of grid strip 68 each have longitudinal borders 76A, 78A and 76B, 78B and transverse side border 80A and 80B along which they can be severed after pasting for forming individual grid plates of a suitable length. As noted, such side borders 80A and 80B are not required, but merely shown for illustrative purposes only. It is also to be appreciated that grid strip 68 can be formed so that each individual grid plate formed therefrom have multiple lugs. In addition, grid strip segments 70A and 70B are shown to include corresponding sets of traverse wires 82A, 84A and 82B, 84B which form corresponding reticulums 86A and 86B. These wires, and the corresponding grooves of the mold cavities on which they're formed, have a cross-sectional depth that is equal to half that typically required to form positive battery grids. It is understood that the description of battery grid strip 68 formed herein also applies to the corresponding mold cavity from which it was cast.

As is conventional for wires formed on continuous casting machines, the wires of reticulum 86A, 86B are generally trapezoidal in cross-section, such that the surface adjacent to shoe 28 during formation (i.e., the top planar surface) comprises a larger area than the bottom planar surface. It is appreciated that the lugs and wires of interconnected grid segments 70A and 70B can be staggered rather than aligned (mirrored) as shown, to meet a plethora of various cell design requirements. It will further be appreciated that where lugs 74B and 74A' are aligned at intersection 79, they can be positioned so as to be staggered and/or interconnected. When dual grid strips 68 and 68' are interconnected along intersection 79, they are sheared apart during a subsequent step.

After the formation of battery grid strip 68, according to this particular method, it can be sheared along nodes 72 to form the two distinct grid strip segments 70A and 70B, which are then pasted with active material in a known manner. Alternatively, dual grid strip 68 may be "folded" along flexible or frangible nodes 72 to form a "layered" battery grid strip. Once folded, the two generally trapezoidal wires, if aligned, establish a generally hexagonal, circular, or possible diamond-like cumulative cross-sectional shape. The overall dimensions of these "mated" trapezoidal wires require less material than one conventional trapezoidal wire having equivalent cross-sectional depth. Therefore, the layered battery grid made from the folded grid strip segments requires less raw materials and yet provides a highly desireable battery grid.

Now referring to FIGS. 5 and 5A, a pair of dual grid strips 90 and 90' are shown that are manufactured according to another preferred method of the present invention. Dual grid strip 90' is identical to 90 and thus, its individual elements are numbered the same but for a primed designation. As such, only elements of dual grid strip 90 are discussed hereafter. As shown, dual grid strip 90 includes a pair of grid strip segments 92A and 92B interconnected along a common edge by flexible or frangible nodes 94. Each grid strip segment 92A and 92B has sets of transverse wires which form a corresponding reticulum 96A and 96B. Dual grid strip 90 has lugs 98A and 98B which border the outer longitudinal edges thereof. As seen, lugs 98B and 98A' are interconnected between grid strip segments 92B and 92A' in a staggered orientation. As shown, a continuous layer of a smaller mesh scrim material 100 has been laid down onto reticulum 96B of grid strip segment 92B and reticulum 96A' of strip segment 92A'. An example of this process is shown in U.S. Pat. No. 4,734,977 issued Apr. 5, 1988, to Blomberg et al., the disclosure of which is expressly incorporated herein by reference. The scrim layer 100 is an open mesh material that acts as a reinforcement and is formed from any lightweight material having high tensile strength which is compatible with a lead acid battery environment. Preferably, scrim 100 is formed from plastic or glass, however, electrically conductive metals such as tantalum can be used. Other preferred reinforcement materials include PermaGlasMesh Incorporated's (of Dover, Ohio) cataloged under PGM 210, PGM 255 BAMILEX *XP403 and PGM 258 BAMILEX *XP482. These reinforcement materials are either asphalt-coated fiberglass fibers or spun-bonded nonwoven polyester mats. FIG. 5A shows the step following the layering of scrim 100 on grid strip segments 92B wherein grid strip segment 92A is folded over onto strip segment 92B along flexible or frangible nodes 94. In a similar manner, FIG. 5A shows grid segment 92B' being folded over onto grid strip segment 92A' along nodes 94'. Thereafter, interconnected layered grid strips 90 and 90' are further processed to separate them along lugs 98B and 98A' and side borders 102 and 102' to form laminated layered plates.

FIG. 6 demonstrates two of the steps utilized in yet another alternative preferred method of the present invention generally directed at forming a "bonded" laminate grid. In general, the method set forth in FIGS. 6 and 7 is a further modified version of that disclosed in reference to FIGS. 5 and 5A. In particular, a reinforcement strip or scrim is sandwiched between and bonded to the grid strip segments following formation on the continuous casting machine. As shown in FIG. 6, a continuous layer of scrim material 100 is passed through an oven 104 having openings 106 and 108 such that scrim 100 becomes slightly heated. Heated scrim 100 is then passed through a hopper 110 having an opening 112. Hopper 110 is filled with a binder material 114 provided in a granular or powder form. Preferably, binder 114 has a low melting temperature and possesses binding properties when heated, such as, for example, Olefin Powder, Microthene, or polyethylene beads. However, a suitable epoxy or pressure sensitive adhesive may also be used. The coated scrim 100 exits hopper 110 and is then laid down onto the still hot battery grid strip segment 92B of dual grid strip 90. Grid strip segment 92A is then folded over onto grid strip segment 92B, as shown in FIG. 5A. Similarly, coated scrim 100 is laid down on grid strip segment 92A' of dual grid strip 90' and grid strip segment 92B' is thereafter folded over grid strip segment 92A. Thereafter, the folded grid strip is mechanically compressed. Examples of suitable compression devices, include chilled bars or polyurethane rollers, which compress the layered grid strip for causing the melted powder to adhesively bond on both grid strip segments.

Now referring to FIG. 7, a partial sectional view of a battery grid plate 116 manufactured from one of the folded grid strips of FIGS. 5 and 5A, via the method partially demonstrated in FIG. 6, is shown. In particular, scrim 100 is shown sandwiched between sets of mating grid wires 118A and 118B respectively associated with grid strip segments 92A and 92B, and bonded thereto by binder 114. As shown, an active material paste mix 120 having fibers 122 mixed therein is coated on layered grid strip 90 to form battery plate 116. Fibers 122 are preferably about ¼ inch long and are typically formed of plastic, Dynel or Polyester. This addition of fibers to the active material in paste mix 120 is referred to as "flocking". The flocking adds substantial strength to paste mix 120. The flocking in combination with scrim 100, with or without the binder 114, provides a significant increase in the tensile strength per unit volume and weight, and thus, immobilizes the entire folded reticulum. Immobilization prevents grid wire elongation and subsequent corrosion. Therefore, the arrangement shown minimizes the requirement for alloying lead for additional strength. As such, pure lead, low tin lead, and very low antimony lead can be used to form battery grids having high tensile strength according to the methods of the present invention. This is beneficial for standard lead acid batteries and essential for valve-regulated and sealed lead acid batteries. Pure lead and low alloys minimize water loss (drying of electrolytes) due to polarization or plating out of alloying elements.

Figure 8:
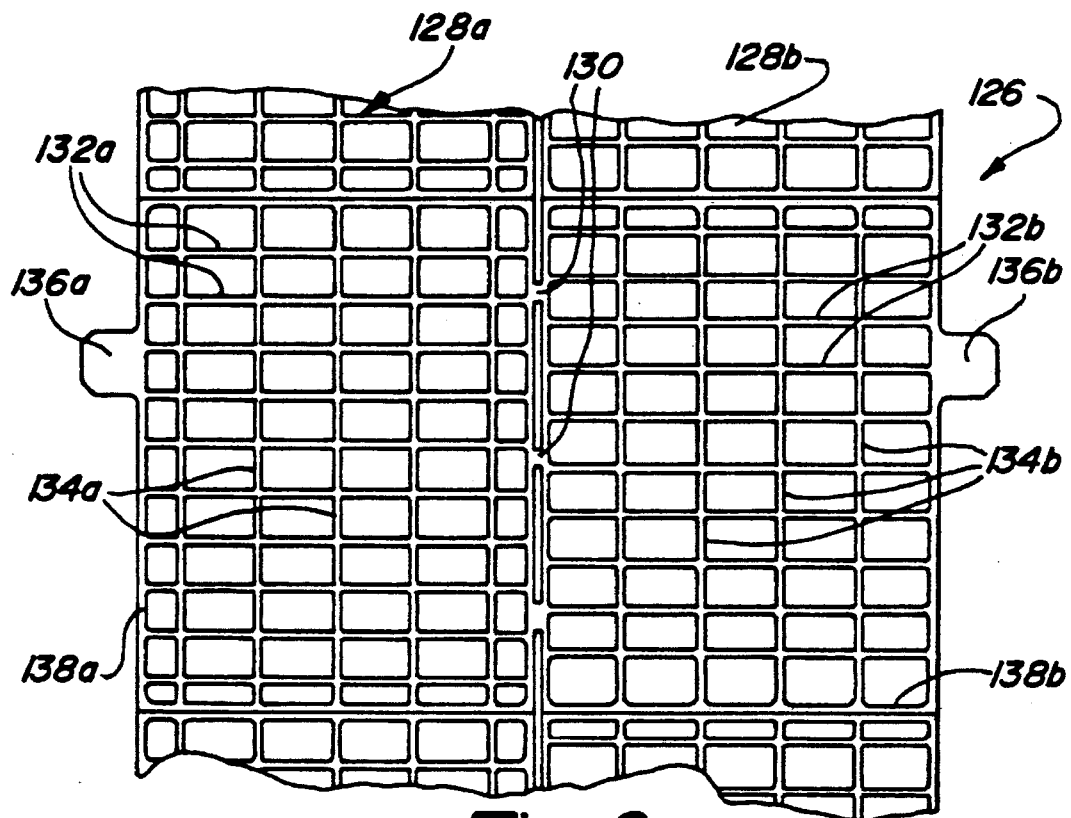
FIG. 8 is a partial plan view of battery grid strips being formed according to an alternative method of the present invention.
Figure 9:
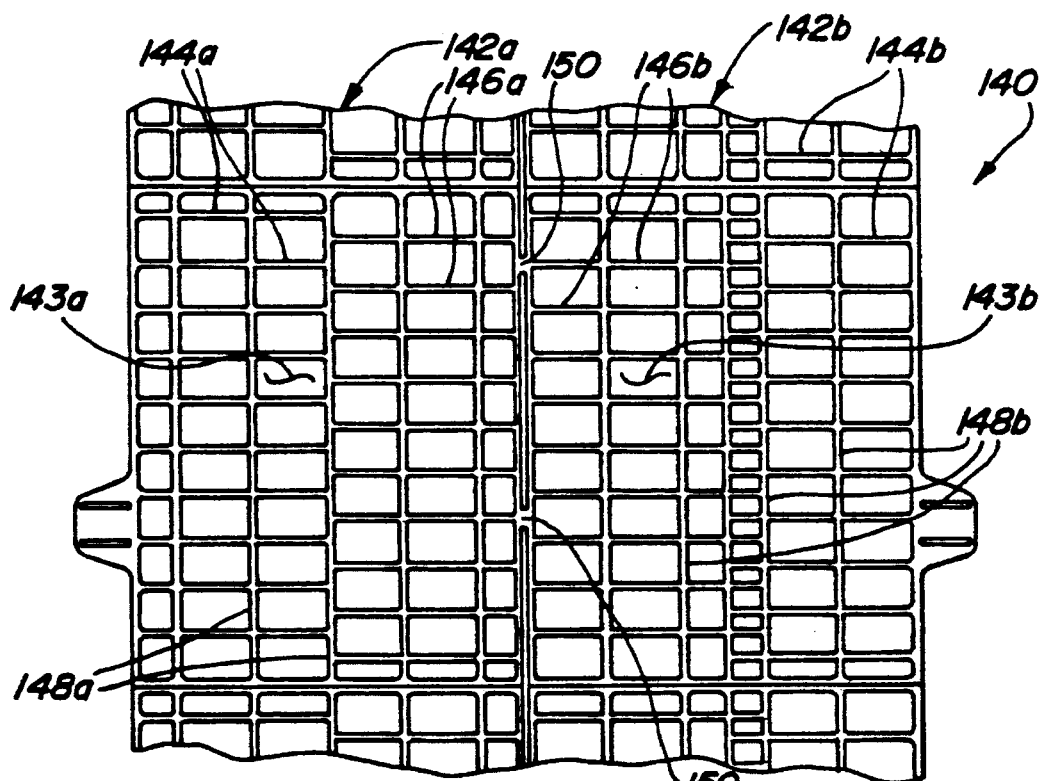
FIG. 9 is a partial plan view of battery grid strips being formed according to yet another alternative method of the present invention.

Two more preferred embodiments of grid strips produced according to the present invention are shown in FIGS. 8 and 9. Now referring to FIG. 8, a dual grid strip 126 is shown. As previously disclosed, another dual grid strip can be cast in side-by-side alignment with grid strip 126 in accordance with the present invention. Dual grid strip 126 is comprised of two individual grid strip segments 128A and 128B. Grid segment 128A is interconnected to grid segment 128B by flexible or frangible nodes 130. Wires 134A and 134B have a greater cross-sectional area than wires 132A and 132B, which run generally transversely to wires 134A and 134B because of grooves being provided in the shoe used to form dual grid strip 126. The wires formed by such grooved shoes are termed to have backribs. However, the cross-sectional area of wires 132A and 132B is less than that associated with conventional negative plates. Wires 134A are staggered with respect to wires 134B and wires 132A are staggered with respect to wires 132B so that upon folding along nodes 130, the ideal pellet size (i.e., opening) of about ¼ of the pellets formed by crossing wires 134A and 134A, is formed. Thus, the desired pellet size is obtained utilizing less lead then would be required by a single layered grid strip. Suitable lugs 136A and 136B are provided as well as suitable border segments 138A and 138B. Preferably, a scrim 100 is sandwiched or bonded between grid strip segments 128A and 128B.

In FIG. 9, a dual grid strip 140 is shown. Dual grid strip 140 comprises two individual grid strip segments 142A and 142B. As clearly seen, grid strip segments 142A and 142B have differing patterned reticulum 143A and 143B, respectively. Grid strip segment 142A comprises wires 144A, 146A and 148A. Similarly, grid strip segment 142B comprises wires 144B, 146B and 148B. Grid strip segment 142A is interconnected to grid strip segment 142B by flexible or frangible nodes 150. Dual grid strip 140 is formed with a grooved shoe, so wires 148A and 148B are formed with backribs. Preferably, wires 144A, 144B, 146A and 146B are generally perpendicular to wires 148A and 148B. Wires 144A and 146A are not continuous so that each is effectively truncated relative to wires 148A. By truncating wires 144A and 146A, their cross-sections relative to their surface areas are increased. Thus, while the cross-sections of wires 148A are actually larger than those of wires 144A and 146A, they effectively equal out. Similarly, wires 146B are not continuous with wires 144B. The balancing of the cross-sectional areas is considered to be effective in equalizing the in-service growth rates of the reticulum wires. Moreover, the growth rate of wire is directly proportional to the surface area and inversely proportional to the cross-sectional area. According to the present invention, the growth rates of wires 144A, 144B, 146A and 146B should not greatly differ than the growth rates of wires 148A and 148B. Thus, the strength of the resulting grid plate is increased by allowing the grid to expand uniformly rather than being pressurized by growth only in particular areas. Additionally, the backribs increase the strength of the grid formed.

While the methodologies of the present invention are particularly well-suited for casting of lead battery grids for lead-acid battery applications, it is contemplated that the improved methods can be applied to form other products having improved strength, higher productivity rates, and reduced consumption of raw materials. Whereas particular embodiments of the invention have been described above, for purposes of illustration, it will be evident to those skilled in the art that numerous variations of details and dimensions, may be made and combined without departing from the invention as defined in the appended claims.

What is claimed is:

1. A battery grid comprising:
   a first reticulum for retaining chemically active battery paste material, said first reticulum formed from an electrically conductive material comprising lead or a lead alloy;
   a second reticulum for retaining chemically active battery paste material, said second reticulum formed from an electrically conductive material comprising lead or a lead alloy;
   an open mesh reinforcing scrim layer mounted between and bonded to said first and second reticulum; and
   means for conductively connecting said first and second reticulum.

2. The battery grid of claim 1 wherein said scrim is bonded to said first and second reticulum by an adhesive binder.

3. A battery grid comprising:
   a first reticulum for retaining chemically active battery paste material, said first reticulum formed from an electrically conductive material; and
   a second reticulum for retaining chemically active battery paste material, said second reticulum formed from an electrically conductive material; and
   means for integrally connecting said first and second reticulum.

4. The battery grid of claim 3 wherein said connecting means is a series of flexible nodes along which said first and second reticulum are folded.

5. The battery grid of claim 4 wherein said first and second reticulums are aligned.

6. The battery grid of claim 3 wherein said first and second reticulum are formed from wires wherein a first set of wires are substantially transverse to a second set of wires, and wherein said first set of wires has backribs and wherein said wires of said first reticulum are not aligned with said wires of said second reticulum.

7. The battery grid of claim 6 wherein said second set of wires is discontinuous.

8. The battery grid of claim 6 wherein a scrim is sandwiched between said first and second reticulum.

9. The battery grid of claim 7 wherein a scrim is sandwiched between said first and second reticulum.

10. A battery grid, comprising:
    first and second integrally connected reticulums for retaining chemically active battery paste material, said first and second reticulum being formed from wires comprising lead or a lead alloy wherein a first set of wires is substantially traverse to a second set of wires, said first set of wires including backribs and wherein the wires of said first reticulum are not aligned with the wires of said second reticulum.

11. The battery grid of claim 10 wherein said second set of wires is discontinuous.

12. The battery grid of claim 10 wherein a scrim is sandwiched between said first and second reticulum.

13. The battery grid of claim 11 wherein a scrim is sandwiched between said first and second reticulum.

14. The battery grid of claim 10 wherein said chemically active battery paste material contains fibers.

15. The battery grid of claim 1 wherein said chemically active battery paste material contains fibers.

16. The battery grid of claim 3 wherein said chemically active battery paste material contains fibers.

* * * * *